United States Patent [19]

Kageyama et al.

[11] 4,137,879
[45] Feb. 6, 1979

[54] EXHAUST GAS RECIRCULATION MEANS

[75] Inventors: Gengo Kageyama; Junji Kamite, both of Hiroshima, Japan

[73] Assignee: Toyo Kogyo Co., Ltd., Hiroshima, Japan

[21] Appl. No.: 806,883

[22] Filed: Jun. 15, 1977

[30] Foreign Application Priority Data

Jun. 17, 1976 [JP] Japan .................................. 51-71852
Jul. 14, 1976 [JP] Japan .................................. 51-84399
Jul. 14, 1976 [JP] Japan .................................. 51-84400
Jun. 22, 1976 [JP] Japan ............................. 51-83422[U]
Jul. 14, 1976 [JP] Japan ............................. 51-94398[U]
Jul. 16, 1976 [JP] Japan ............................. 51-95236[U]
Jul. 16, 1976 [JP] Japan ............................. 51-95237[U]

[51] Int. Cl.² ............................................ F02M 25/06
[52] U.S. Cl. ................................................ 123/119 A
[58] Field of Search ................................... 123/119 A

[56] References Cited

U.S. PATENT DOCUMENTS

| | | | |
|---|---|---|---|
| 1,457,870 | 6/1923 | Zurborg ............................ | 123/119 A |
| 1,541,583 | 6/1925 | Merz ................................. | 123/119 A |
| 3,581,719 | 6/1971 | Gau .................................. | 123/119 A |
| 3,626,913 | 12/1971 | Sarto ................................ | 123/119 A |
| 3,646,764 | 3/1972 | Nakasima et al. ............... | 123/119 A |
| 3,672,340 | 6/1972 | Bomba ............................. | 123/119 A |
| 3,738,342 | 6/1973 | Lewakowski ..................... | 123/119 A |
| 3,844,260 | 10/1974 | Scott, Jr. et al. ................ | 123/119 A |
| 3,877,845 | 3/1975 | Schultz ............................ | 123/119 A |
| 3,882,837 | 5/1975 | Horie et al. ...................... | 123/119 A |

FOREIGN PATENT DOCUMENTS

| | | | |
|---|---|---|---|
| 2549880 | 5/1977 | Fed. Rep. of Germany ...... | 123/119 A |
| 562237 | 8/1923 | France .............................. | 123/119 A |
| 1438764 | 6/1976 | United Kingdom ............... | 123/119 A |

*Primary Examiner*—Wendell E. Burns
*Attorney, Agent, or Firm*—Wenderoth, Lind & Ponack

[57] ABSTRACT

Exhaust gas recirculation means by which recirculated exhaust gas is supplied into a portion of a carburetor that is downstream of the venturi section of the carburetor, whereby fouling of easily blocked elements in the upstream portion of the carburetor is avoided, and in which supply of exhaust gas into the carburetor is in opposition to a supplementary supply of air from the atmosphere or from a portion of the carburetor which is upstream of the venturi, air and exhaust gas being supplied through a common port into the carburetor. The pressure of exhaust gas being comparatively high, the supplementary supply of air is steadily decreased as the amount of recirculated gas is increased, whereby the air-fuel ratio of a mixture supplied to an engine is decreased and the mixture is enriched in a manner required when exhaust gas is recirculated.

12 Claims, 11 Drawing Figures

EXHAUST GAS RECIRCULATION MEANS

The present invention relates to an exhaust gas recirculation means employable in association with an internal combustion engine. More particularly the invention relates to an improved exhaust gas recirculation means wherein the quantity of recirculated exhaust gas is controlled, and the air-fuel ratio of a combustible mixture is automatically adjusted in proportion to the rate of recirculation of exhaust gas, whereby adverse effects caused by recirculated exhaust gas on engine performance are avoided, and the emission of nitrogen oxides in the exhaust gas is effectively reduced.

To reduce emission of nitrogen oxides in the exhaust gas of an internal combustion engine, of an automobile, for example, it is known to recirculate a portion of the exhaust gas back to a combustion chamber in the engine. Exhaust gas recirculation systems are broadly divided into two types, one in which recirculated exhaust gas is introduced into a portion of a carburetor which in terms of flow of air through the carburetor is upstream of the venturi section of the carburetor, and the other in which the gas is introduced into the carburetor downstream of the venturi section. In this latter type of system, the recirculated exhaust gas may be introduced at a position intermediate between the venturi section and a throttle valve, or downstream of the throttle valve. In the case where the gas is introduced upstream, automatic adjustment of the air-fuel ratio to the rich side is accomplished, since negative pressure in the venturi section and, hence, the amount of introduced fuel from a main nozzle are unaffected and also a portion of the intake air is replaced by recirculated exhaust gas containing unburned components of fuel. This is advantageous, since recirculation of exhaust gas demands employment of a richer air-fuel mixture. On the other hand, carbon and other impurities contained in the recirculated exhaust gas cause blockage or partial blockage of comparatively small orifice portions of the carburetor such as air-vent-pipes, air-bleeders or the main nozzle, and since the gas has a large moisture content, water tends to freeze in the vicinity of the venturi section, with the result that in a short time the carburetor fails to function correctly. These problems can be overcome by providing in the exhaust gas recirculation line leading to the carburetor filters for removal of impurities and a water trap for condensation of moisture contained in the exhaust gas, but provision of such elements, as well as making the recirculation system large and costly, also constitute impedance elements which make it difficult to ensure efficient recirculation of exhaust gas. A system in which recirculated exhaust gas is introduced into a portion of the carburetor downstream of the venturi section avoids these problems, but in conventional systems of this type recirculation of exhaust gas simply results in a reduction of the proportion of air-fuel mixture which reaches the combustion chamber, and there is no automatic modification of the air-fuel ratio, and the system fails to produce satisfactory enrichment such as achieved when the gas is introduced upstream of the venturi section.

The present invention provides a means which combines the advantages of both the above-described types of exhaust gas recirculation systems, and in which recirculated exhaust gas is introduced into an intermediate portion between the venturi section and the throttle valve of a carburetor which is downstream of the venturi section via a recirculation port which is also in communication with a supplementary air duct leading to the atmosphere or to a portion of the carburetor which is upstream of the venturi section. When a large amount of exhaust gas is being recirculated the amount of air which can enter the carburetor via the recirculation port is limited, because of the higher pressure of the exhaust gas, but when a comparatively small amount of or no exhaust gas is being recirculated more air can be supplied into the carburetor along the supplementary air duct, whereby the air-fuel ratio of the mixture supplied to the combustion chamber is automatically adjusted in proportion to the quantity of recirculated exhaust gas, while at the same time problems of freezing or fouling of small orifice portions of the carburetor are effectively avoided.

According to the present invention, there is provided an exhaust gas recirculation means employable in an internal combustion engine comprising a carburetor including in successive downstream portions thereof a choke section provided with a choke valve and constituting the air intake portion of the carburetor, a venturi section, a fuel introduction system for introduction of fuel into air passing through said venturi section, and a throttle section provided with a throttle valve and communicating with an inlet manifold leading to one or more combustion chambers of said engine, and exhaust pipe means for removal of exhaust gas from said engine, and which comprises port means which opens to an interior portion of said carburetor which is downstream of said venturi section; an exhaust gas recirculation line which has one end connecting to said exhaust pipe means and into and along which a portion of said exhaust gas may pass, and which has a delivery end portion which communicates with said port means and from which said exhaust gas may be delivered through said port means into said carburetor; flow control means provided on said recirculation line and adjustable to control the flow of said exhaust gas along said line; and a supplementary air duct which has an inlet end opening to an air source which is upstream of said venturi section or external to said carburetor, and has a delivery end portion which is in communication with said port means, from which air may be delivered through said port means into said carburetor and which is so disposed that the flow of air therein is in a direction which is opposed to the direction of flow of exhaust gas in the delivery portion of said recirculation line.

A better understanding of the present invention may be had from the following full description of several preferred embodiments thereof when read in reference to the attached drawings, in which like numbers refer to like parts and FIG. 1 is a cross-sectional drawing showing the main portions of an exhaust gas recirculation means according to a first embodiment of the invention;

Figure 6:
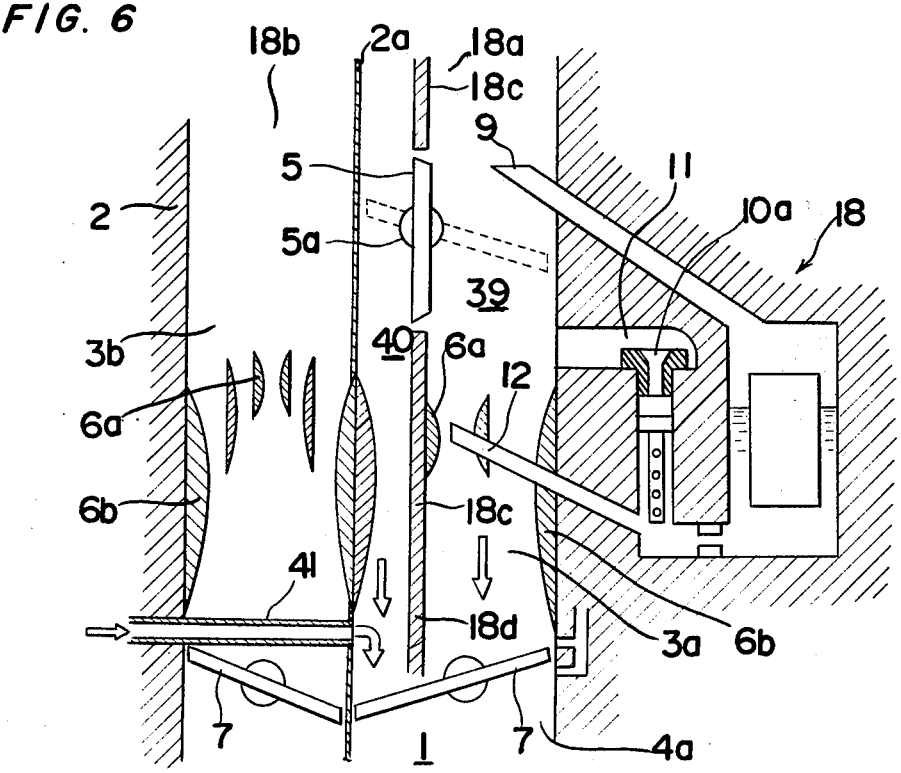
Figure 7:
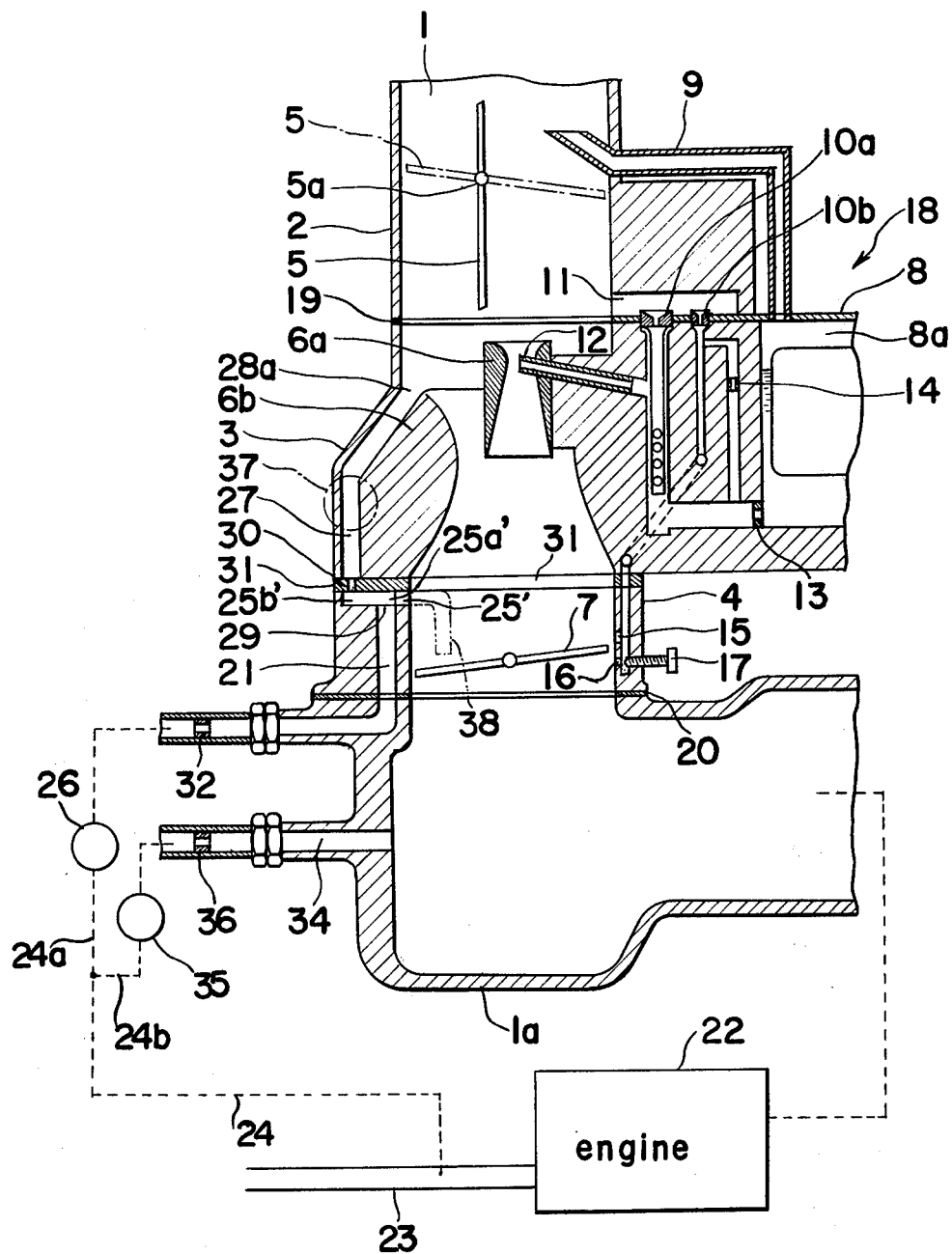
Figure 8:
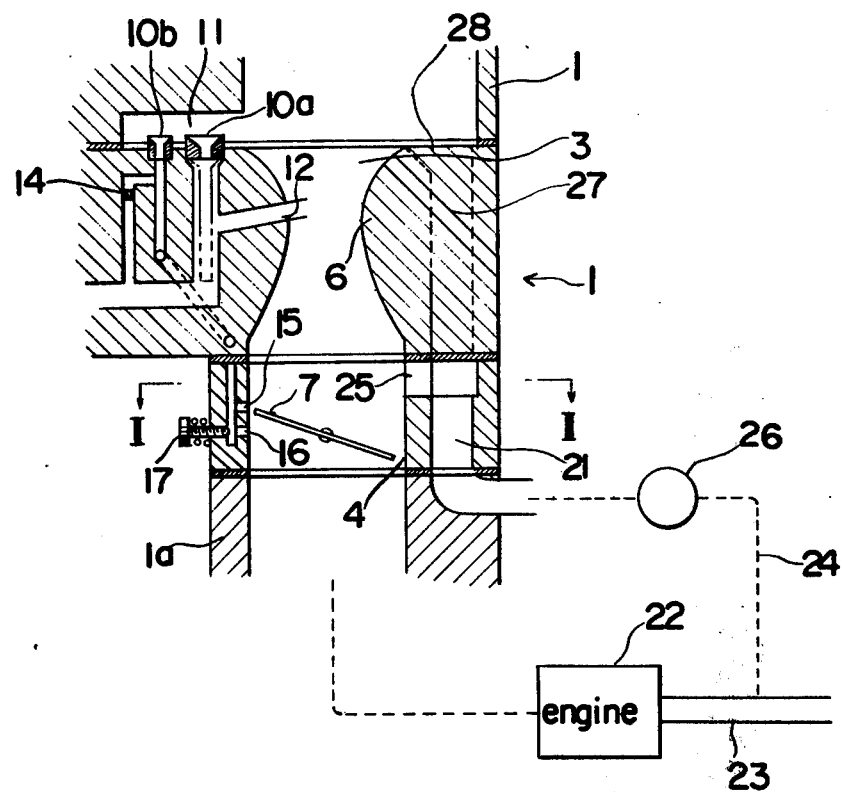
Figure 9:
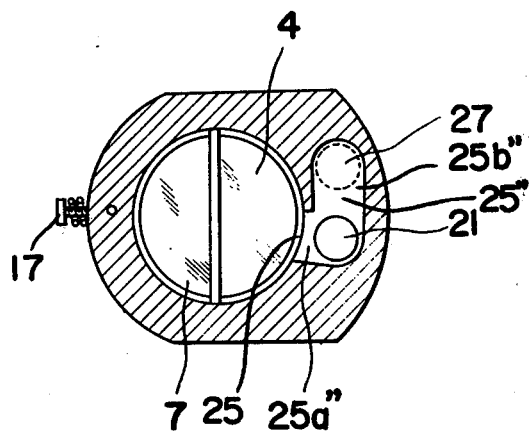

FIGS. 6, 7, and 8 are cross-sectional views showing main elements of other embodiments of the invention; and FIG. 9 is a cross-sectional view taken along the line I — I of FIG. 8.

Figure 1:
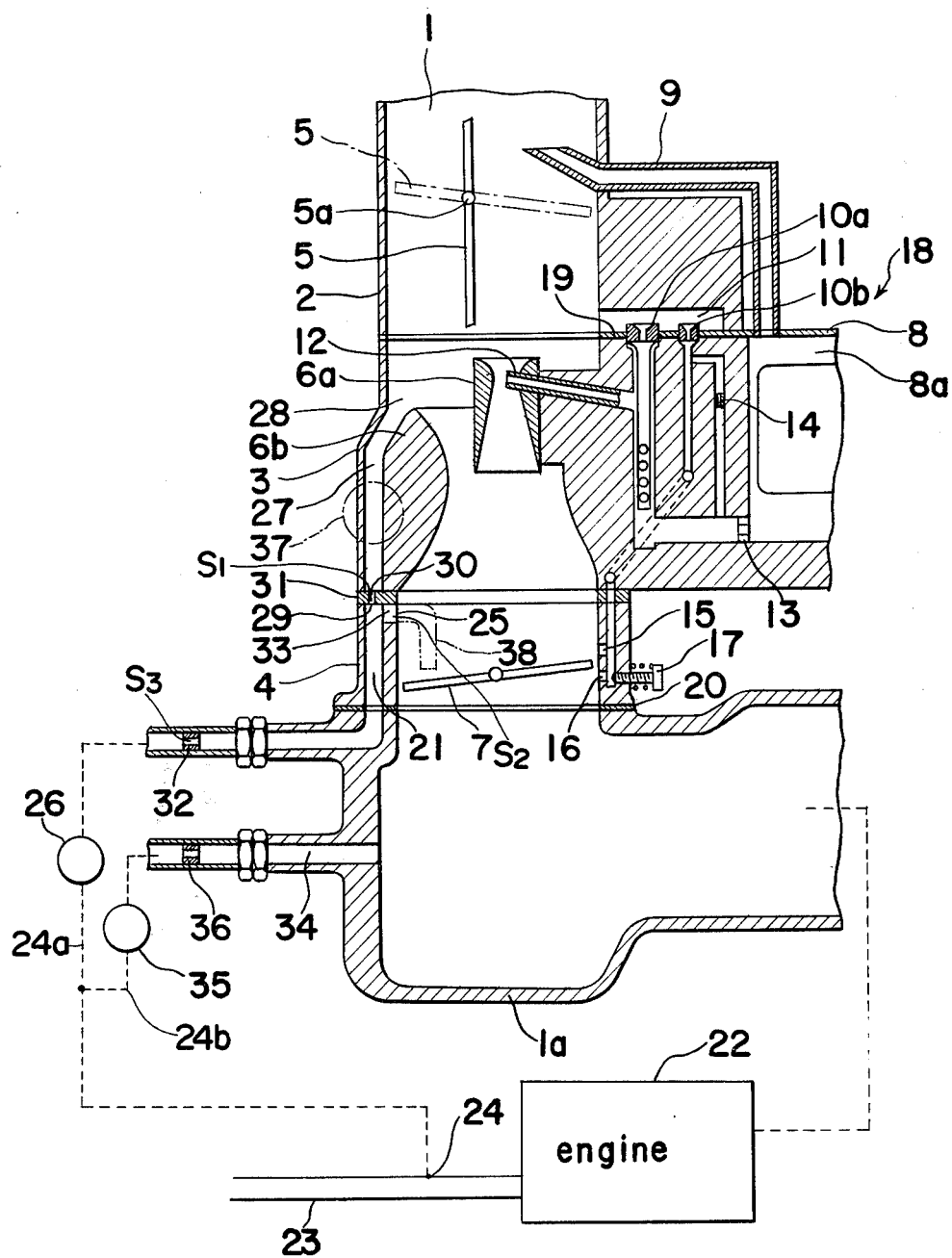

Referring initially to FIG. 1, an air-fuel mixture is supplied to an engine, indicated schematically by the reference number 22, by an air intake circuit 1 comprising an intake manifold 1a, and having a choke section 2, venturi section 3, and throttle section 4, which in terms of flow of air towards the engine 22 constitute successively downstream portions of the circuit 1. A choke valve 5 provided in the choke section 2 can be turned by a shaft 5a which is attached to an off-center portion of the valve 5 and is connected to a known control means. In the venturi section 3, there are coaxially provided two venturi defining members respectively defining a small venturi 6a and a large venturi 6b. In the throttle section 4, there is provided a throttle valve 7, which is a suitable distance downstream of the large venturi 6b and which is connected to and positionable by, for example, a pedal, not shown, controlled by an operator. Fuel from a float bowl 8 may be supplied via a main jet 13 to a main nozzle 12 which serves to introduce fuel into air flowing through the small venturi 6a and also communicates via a main air bleeder 10a and duct 11 to a portion of the air intake circuit 1 which is upstream of the small venturi 6a. For low-load operation of the engine 22 fuel is supplied via a slow jet 14 to a slow port 15 and an idle port 16, which are respectively upstream and downstream of the throttle valve 7 when it is in the fully closed position, the slow jet 14 communicating with the air intake circuit 1 via the slow air bleeder 10b and the above-mentioned duct 11, and an idle adjustment screw 17 being provided in association with the idle port 16. The above-described elements are disposed in a conventional manner to constitute a carburetor 18, which is suitably provided with sealing means such as gaskets 19 and 20, for example, and with insulation means of bakelite or similar material 31 which serves to protect the portions of the carburetor 18 from the effects of heat of recirculated exhaust gas entering the carburetor 18.

A portion of the exhaust gas which leaves the engine 22 via an exhaust pipe 23 is taken off via a recirculation line 24 and led to branch lines 24a and 24b, on which are provided flow control valves 26 and 35 respectively, and lead to recirculation lines 21 and 34 respectively. The valves 26 and 35 may completely shut off flow of exhaust gas and are positioned independently or together in response to the engine operating conditions, and are controlled, for example, to close during warming up of the engine by means of low temperature detection elements, or diaphragm elements for detection of high negative pressure downstream of the throttle valve 7. The recirculation line 34, the bore of which is effectively determined by an orifice element 36 provided therein, leads directly to the intake manifold 1a downstream of the throttle valve 7. According to the invention, the recirculation line 34 is not essential, but is provided to allow greater amounts of exhaust gas to be recirculated when necessary, and also to permit greater versatility of control of the amount of recirculated gas.

The recirculation line 21 comprises a portion which is connected to the branch line 24a and in which there is provided an orifice element 32 having a cross-sectional area S3, and a delivery end portion of which is generally parallel to the flow of air through the carburetor 18 to connect to a port 25 and is provided in a wall portion of the carburetor 18 which is generally opposite the wall portion in which the slow port 15 and idle port 16 are provided. Exhaust gas supplied into the recirculation line 21 exits therefrom and enters the carburetor 18 via the port 25 which has a cross-sectional area S2, is located intermediate the venturi section 6 and throttle valve 7 when it is in the fully closed position, and is preferably nearer the valve 7 than the venturi section 6 in order to minimize the influence of recirculated exhaust gas on pressure conditions obtaining in the venturi section 6.

Also in a line generally parallel to the flow of air through the carburetor 18 there is formed in the wall of the carburetor 18 a supplementary air duct 27 which in this embodiment is in line with the exhaust gas recirculation line 21 and, in a down-draft type of carburetor such as shown in FIG. 1, is in effect a vertical continuation of the line 21. The lower end of the duct 27 is immediately above the port 25 and has provided therein an orifice element 30 having a cross-sectional area S1. The upper end of the duct 27 defines an opening 28 which communicates with the interior of the carburetor 18 and is located intermediate the choke section 2 and throttle section 4, the opening 28 being level with the top of the large venturi 6b, and arranged at the outside of the small venturi 6a, in the embodiment shown in FIG. 1. The opening 28 is intended to admit only air into the duct 27 and may therefore be intermediate the venturi section 3 and choke valve 2, and should be at least higher than the lower end of the small venturi 6a. Alternatively the opening 28 may open to the atmosphere, and in this case there is provided in the duct 27 a suitable filter not shown.

In the above-described construction, exhaust gas is recirculated via the line 21 into the carburetor 18 and via the line 34 into the intake manifold 1a at rates of flow determined by the settings of the flow control valves 26 and 35. At the same time, air flows into the supplementary air duct 27. However, the amount of air which exits via the port 25 into the carburetor 18 depends on the amount of exhaust gas currently being supplied along the recirculation line 21. If the control valve 26 is completely closed, air from the duct 27 will exit freely from the port 25, but when there is a large rate of flow of exhaust gas in the line 21, exit of air via the port 25 is entirely or almost entirely prevented, since the pressure of the exhaust gas is higher than that of the air in the duct 27. Thus, the air-fuel ratio of a mixture delivered to the engine 22 is not in a simple relation to the amount of recirculated exhaust gas, but flow of air in the duct 21 in effect constitutes a compensation factor thanks to which the optimum air-fuel ratio for different operating conditions is obtained, and the proportion of recirculated exhaust gas to the amount of air-fuel mixture coming from the venturi section 3 is enriched automatically as greater amounts of exhaust gas are recirculated, and becomes leaner when the amount of recirculated exhaust gas is reduced, or cut off, as, for example, happens when the engine 22 is operated cold.

Figure 2:
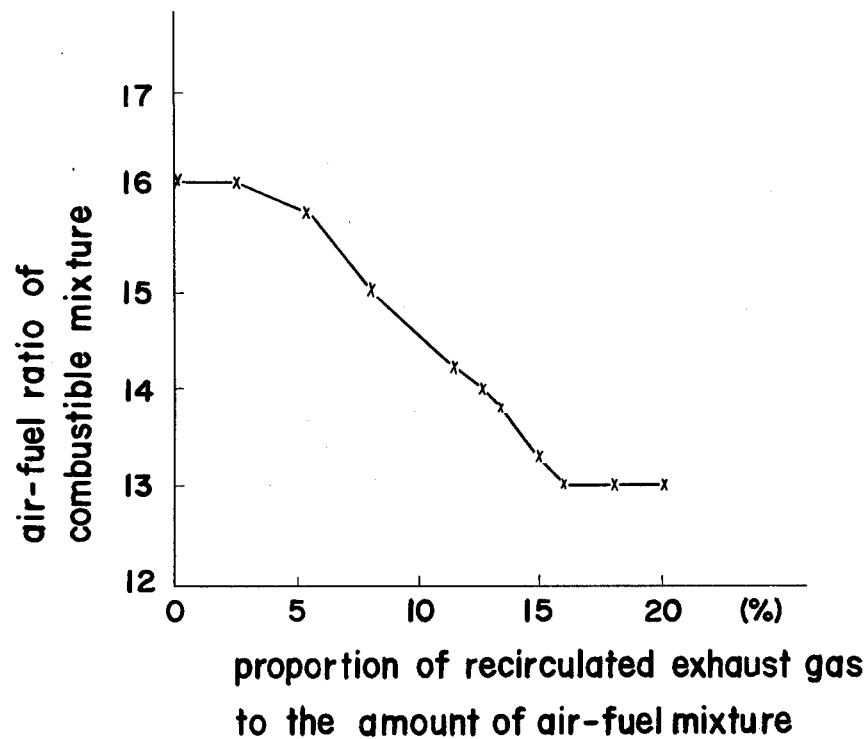
FIG. 2 is a graph showing the effect on the air-fuel ratio of a combustible mixture delivered to a combustion chamber in the means of FIG. 1 produced by variation of the proportion of recirculated exhaust gas to the amount of air-fuel mixture coming from the venturi section of a carburetor.

The relationship between the air-fuel ratio of a mixture delivered to the engine 22 and the exhaust gas recirculation ratio, defined here as the proportion, expressed as a percentage, of the amount of recirculated exhaust gas to the amount of air-fuel mixture exiting from the venturi section 3, is shown by the test results of tests plotted in FIG. 2, to which reference is now had, and in which the ordinate shows values of the air-fuel ratio and the abscissa values of the exhaust gas recirculation ratio. In the tests the results of which are plotted, engine speed was kept constant at 2000 r.p.m., intake pressure in the venturi section 3 of the carburetor 18 was kept constant at − 100 mm Hg, and the valves 26 and 35 were gradually opened, in order to increase the amount of recirculated exhaust gas. As seen from FIG. 2, for up to about 5% recirculation there is very little change in the air-fuel ratio, and then the air-fuel ratio passes the ideal ratio of 15 as recirculation increases from 5 – 10%. The air-fuel ratio continues to decrease as recirculation is increased, and is about 13 for 15% recirculation. Increasing recirculation from 15% to 20% results in no further change in the air-fuel ratio.

Thus, with the means of the invention, while lean air-fuel mixtures are easily obtained for operating conditions requiring such mixtures, an increase of the amount of recirculated exhaust gas is accompanied by a decrease in the amount of air which can exit from the duct 27 into the carburetor 18, and so the air-fuel mixture is automatically enriched, which is a requirement when exhaust gas is recirculated. It will be noted that requisite enrichment or leaning of the air-fuel mixture in response to the amount of recirculated exhaust gas is achieved by a very simple construction requiring no special controls, thus permitting the means of the invention to be produced at low cost.

Needless to say, the delivery end portion of the recirculation line 21 need not actually be within a wall portion of the carburetor 18, in the manner shown in FIG. 1, but may be a line which is external to the carburetor 18 and which communicates with a delivery line which extends through the wall of the carburetor 18 and leads to the port 25. Also, if the supplementary air duct 27 communicates with the atmosphere, both the recirculation line 21 and the air duct 27 may be external to the carburetor 18.

Figure 3:
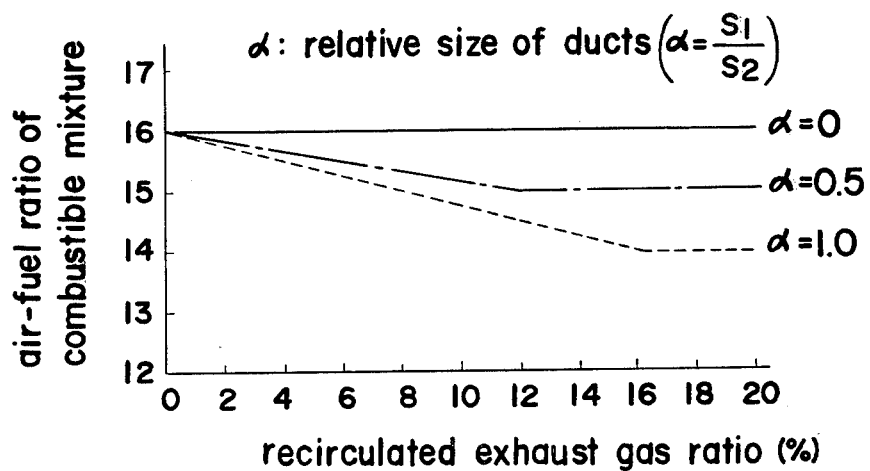
FIG. 3 is a graph showing the relation between the air-fuel ratio of a combustible mixture, the recirculated exhaust gas ratio, and the relative size of the ducts through which the exhaust gas and a supplementary air supply pass.

Concerning the relative size of the line 21, port 25, and duct 27, the cross-sectional area S3 of the orifice element 32, which may be regarded as effectively determining the bore of the recirculation line 21, should not be larger and is preferably smaller than the cross-sectional area S2 of the port 25, i.e., $S2 \geq S3$, since for other relative sizes there is liable to be inefficient discharge of recirculated exhaust gas via the port 25. The ratio of the cross-sectional area S1 of the orifice element 30, which effectively determines the bore of the supplementary air duct 27 affects the degree of enrichment achieved in response to increasing the amount of recirculated exhaust gas, as shown in FIG. 3, which plots the air-fuel ratio versus the exhaust gas recirculation ratio for different values of the ratio $\alpha = S1/S2$. It is seen that when ratio $\alpha = 0$, i.e., when the supplementary air duct 27 is not provided, increasing the recirculated exhaust gas ratio has practically no effect on the air-fuel ratio, but that when $\alpha = 0.5$, i.e., when $S1 = \frac{1}{2} S2$, increasing the amount of recirculated exhaust gas causes enrichment of the air-fuel mixture, up to about 12% recirculation, after which the air-fuel ratio remains constant at just above 15, even if recirculation is increased up to 20%. If the areas S1 and S2 are made equal and $\alpha = 1.0$, the air-fuel ratio decreases steadily with the increased amount of the recirculated exhaust gas until about 16% recirculation is reached, after which the air-fuel ratio remains steady at about 14. On the other hand, if the cross-sectional area S1 of the orifice element 30 is made larger than the cross-sectional area S2 of the port 25, resistance to flow through the air duct 27 becomes smaller than resistance to flow through the port 25, and consequently exhaust gas is liable to flow into the duct 27 rather than passing through the port 25. The relation of the areas S1 and S2 is therefore preferably $S2 \geq S1$.

Figure 4:
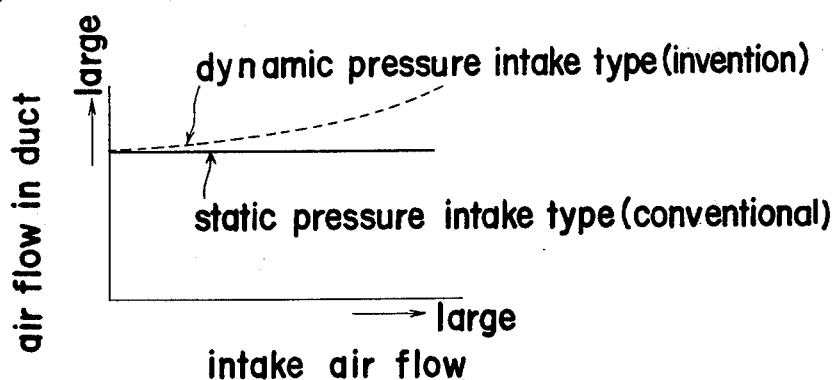
FIG. 4 is a graph illustrating the effect of different inlet opening configurations of a supplementary air duct on the proportion of air flow in the duct to the intake air flow into a carburetor.

Whether the inlet opening 28 of the air duct 27 opens at the upper part of the interior of the carburetor 18 or to the atmosphere, it is preferably a dynamic pressure intake type, i.e., is so disposed that the plane of the inlet opening 28 is approximately normal or facing the direction in which air that subsequently enters the duct 27 is flowing prior to entry into the duct 27, i.e., in the embodiment shown in FIG. 1, in which the plane of the opening 28 is preferably an approximately horizontal plane. With such an opening 28, there is an increase of air flow in the duct 27 with an increase of air intake into the carburetor 18, for example, and the contribution to the air flow in the duct 27 is therefore proportional to air intake. This is illustrated in FIG. 4 which shows the general relation between air flow in the duct 27 and intake air flow into the carburetor 18 in the means of FIG. 1 when no exhaust gas is recirculated, and air flow in the duct 27 when opening 28 thereof is a dynamic pressure intake type is indicated by the dashed curve. In contrast to this, if the duct 27 has an inlet opening 28 of the static pressure intake type, i.e., if the plane of the opening 28 is generally parallel to or escaping from the flow of air through the carburetor 18, proportional control of the air-fuel ratio fails to be achieved, since there is no noticeable change of the rate of air flow through the duct 27 with varying rates of air intake into the carburetor 18, as indicated by the full-line portion of the graph of FIG. 4.

Figure 5:
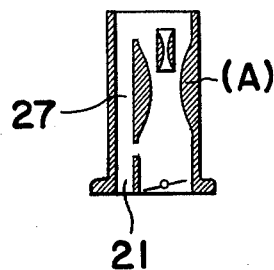
FIG. 5(c) is a graph illustrating the effect of inlet opening types A and B of the supplementary air ducts, as shown in FIGS. 5(a) and (b), on the relation of the recirculated exhaust gas ratio and the rate of air-fuel ratio compensation.
Figure 5:
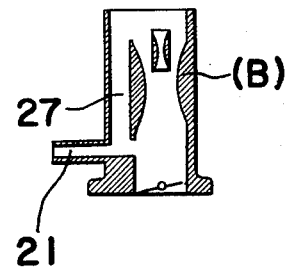
Figure 5:
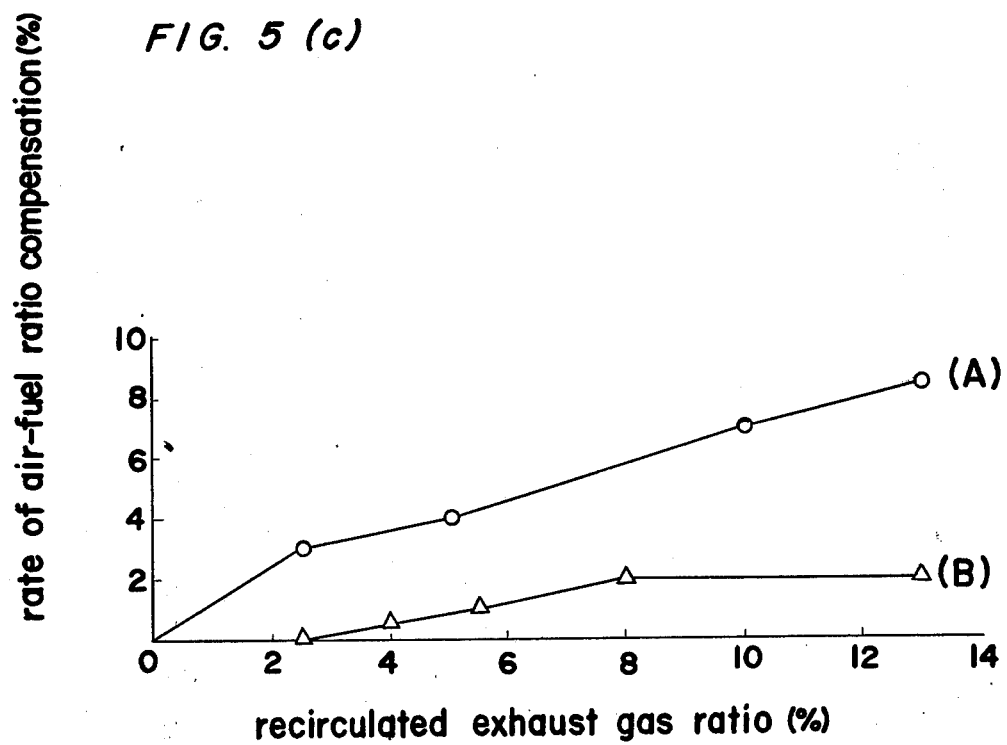

Referring now to FIGS. 5a–5c, it is preferable that the recirculation line 21 and the supplementary air duct 27 are so disposed relative to one another that flow of exhaust gas in the line 21 is more or less directly opposed by or facing the flow of air in the duct 27, i.e., is in the disposition indicated schematically in portion (A) of FIG. 5(a), since this disposition achieves better results with respect to air-fuel ratio compensation (%), which is determined by subtracting the value of the air-fuel ratio of the mixture supplied to the engine 22 when exhaust gas is recirculated, from the value of the air-fuel ratio when there is no recirculation of exhaust gas, and dividing the result of this subtraction by the value of the air-fuel ratio when there is no recirculation of exhaust gas, and multiplying this ratio by 100. The schematic drawing in portion (B) of FIG. 5(b), shows an arrangement according to the invention and in which delivery of exhaust gas from the recirculation line 21 to the port 25 is normal to delivery of air from the duct 27 to the port 25. Tests were conducted using the constructions shown in (A) and (B) of FIG. 5 to determine the effect on air-fuel ratio compensation (%) due to the different constructions. In the tests engine speed was 2000 r.p.m., intake pressure was − 100 mm Hg, and in both constructions (A) and (B) the orifice element 30 in the duct 27, port 25, and the orifice element 32 in the line 21 had a circular cross-section of a diameter 10 mm, 9 mm, and 10 mm respectively. The results of the tests are shown in the graph of FIG. 5(c), from which it is seen that although construction (B) affords a certain amount of air-fuel compensation (%) with increasing recirculation of exhaust gas, much greater compensation is achieved with construction (A), and is greater than 8% for approximately 13% recirculation. In other words, in construction (A) since recirculated exhaust gas is able to offer much greater resistance to flow of air in the duct 27, enrichment of the air-fuel mixture is effected efficiently regardless of the increased air intake to the carburetor 18.

Referring back to FIG. 1, during actuation of the engine 22 in cold conditions, etc., the flow control valves 26 and 35 are suitably closed completely, by control means such as noted above, or by control means actuated by an operator. To prevent infiltration of exhaust gas into the upper portion of the carburetor 18 at high rates of recirculation, there may be provided in the air duct 27 between the orifice element 30 and the inlet opening 28 thereof an expansion chamber or a trap 37 indicated by the one-dot chain line portion of the drawing. Further, to avoid fouling of the slow port 15 and the idle port 16, the exhaust gas recirculation port 25 is suitably positioned so that it does not directly face the ports 15 and 16, or there may be provided on the port 25 an extension 38, which, as indicated by the two-dot chain line portion of the drawing, extends downwards and serves to direct recirculated exhaust gas into the carburetor 18 in the direction of flow of the air-fuel mixture through the carburetor 18. Thus, the main advantages of the invention may be summarized as follows.

(1) Enrichment of the air-fuel mixture is achieved automatically as the amount of recirculated exhaust gas is increased.

(2) This enrichment is unaccompanied by fouling of portions of the carburetor which are particularly liable to blockage, in particular in the venturi section of the carburetor and the portion thereof upstream of the carburetor.

(3) The construction is very simple and requires no major modification of conventional carburetor construction, since the recirculation means is provided essentially in a portion which is simply a wall portion of a conventional carburetor.

FIG. 6 shows another embodiment of the invention which is employed in a carburetor comprising a primary section 18a for low speed operation of an engine and a secondary section 18b employed during high speed operation of the engine, and separated from the primary section 18a by a suitable wall element 2a. The primary section 18a includes a choke section 2a, a venturi section 3a, to which fuel is supplied by a fuel-introduction system such as described above, and a throttle section 4a. The secondary section 18b comprises a venturi section 3b. The primary section 18a is divided into an air and fuel flow passage 39 and a supplementary air duct 40 by wall elements 18c and 18d which are provided respectively above and below a choke valve 5a in choke section and are in vertical line with one another and with the choke valve 5a in the fully opened position, there being a sufficient space between wall elements 18c and 18d to permit unhindered movement of the choke valve 5a. The air duct 40 serves basically the same function as the above-described supplementary air duct 27 of FIG. 1. The exhaust gas is recirculated in the means of FIG. 6 by a recirculation line 41 which connects to an exhaust gas take-off system such as the line 24 described in connection with FIG. 1 and extends through a portion of secondary section 18b which is intermediate the levels of venturi section 3a and throttle section 4a of primary section 18a.

In FIG. 7, there is shown another embodiment of the invention according to which air and recirculated exhaust gas are supplied to the port 25, so as to enter the carburetor 18 via a short passage 25' which is in a more or less horizontal line and is defined in a wall portion of the carburetor 18, the inner end portion 25a' of which, i.e., the end thereof which is innermost with respect to the carburetor 18, opens to port 25, and the outer end portion 25b' of which is closed. The recirculation line 21 connects to the inner end portion 25a', and the supplementary air duct 27 to the outer end portion 25b' of the passage 25', i.e., the points of introduction of air and exhaust gas into the passage 25' are staggered on the horizontal, which offers the advantage that there is much less possibility of exhaust gas reaching the upper portion of the carburetor 18.

In the embodiment of FIG. 7, and in other embodiments of the invention, there is suitably provided between venturi section 3 and throttle section 4, for example, immediately above recirculation port 25, an insulation element 31 of bakelite or similar material which serves to protect upper portions of the carburetor 18, in particular the fuel supply and injection system, from the effects of the heat of the recirculated exhaust gas entering the carburetor 18.

FIGS. 8 and 9 show a modification of the means of FIG. 7 in which air and recirculated exhaust gas are supplied to the port 25 via a horizontal passage 25" comprising a portion 25a" leading to the port 25, and a portion 25b" which connects to the outer end of and is approximately at right-angles to the portion 25a" and is closed at the end thereof furthest from portion 25a". The recirculation line 21 connects to the junction of portions 25a" and 25b" of the passage 25", and the supplementary air duct 27 supplies air into the end of the passage portion 25b" which is further removed from the portion 25a". Compared with the means of FIG. 7, the means of FIGS. 8 and 9 allows the wall portion in which the port 25 and passage 25" to be thinner, thus allowing the carburetor 18 to be more compact.

In addition thereto, further changes and modifications will be apparent to those skilled in the art upon reading of the description of the present invention with or without reference to the accompanying drawings. Therefore, these changes and modifications are to be construed as being included within the true scope of the present invention unless they depart therefrom.

What is claimed is:

1. In an internal combustion engine having a carburetor including, a choke section constituting an air intake portion of said carburetor, a venturi section connected downstream of the choke section and provided with a venturi, a fuel introduction system connected to said venturi section for introduction of fuel into air passing through said venturi section, and a throttle section connected downstream of the venturi section and provided with a throttle valve, a slow port and idle port and communicating with an inlet manifold leading to a combustion chamber of said engine, the slow port and the idle port being positioned respectively upstream and downstream of the throttle valve when the throttle valve is in the fully closed position, and exhaust pipe means for removal of exhaust gas from said engine;

exhaust gas recirculation means comprising:

port means which opens to an interior portion of said carburetor which is intermediate said venturi and said throttle valve;

an exhaust recirculation line which has an inlet end portion connected to said exhaust pipe means, and a delivery end portion communicating with said port means for delivering exhaust gas through said port means into said carburetor, and flow control means in said exhaust recirculation line adjustable to control the flow of exhaust gas; and a supplementary air duct in said carburetor, and which has an inlet end opening upstream of said venturi, and a delivery end portion communicating with said port means for delivering air through said port means into said carburetor.

2. Exhaust gas recirculation means as claimed in claim 1, wherein the delivery end portion of said supplementary air duct has an orifice element therein.

3. Exhaust gas recirculation means as claimed in claim 1, wherein the effective cross-sectional area of said port means is at least equal to the effective cross-sectional area of said delivery end portion of said exhaust recirculation line and is at least equal to the effective cross-sectional area of said delivery end portion of said supplementary air duct.

4. Exhaust gas recirculation means as claimed in claim 1, wherein the opening of the inlet end of said supplementary air duct is disposed with the plane thereof approximately normal to the direction in which air is flowing prior to entry into said supplementary air duct.

5. Exhaust gas recirculation means as claimed in claim 1, wherein said supplementary air duct and said exhaust recirculation line are connected to said port means for causing the flow of air in the supplementary air duct to be opposed to the flow of exhaust gas in the delivery portion of said exhaust recirculation line.

6. Exhaust gas recirculation means as claimed in claim 1, wherein said port means is constituted by a simple opening in the internal wall surface portion of said carburetor, said delivery portion of said recirculation line is in a wall portion of said carburetor and leads directly to said opening, and said delivery portion of said air duct is in the wall portion of said carburetor and is in generally straight-line alignment with said delivery portion of said recirculation line.

7. Exhaust gas recirculation means as claimed in claim 1, which further comprises insulation means provided intermediate said port means and said fuel introduction system.

8. Exhaust gas recirculation means as claimed in claim 1, wherein said air duct has an expansion chamber therein between said inlet end and said delivery end portion thereof for preventing exhaust gas which may enter therein from said recirculation line from flowing into the upper portion of said carburetor.

9. Exhaust gas recirculation means as claimed in claim 1, wherein said port means has an extension which extends downwards into said carburetor and serves to direct recirculated exhaust gas into the carburetor in the direction of flow of air-fuel mixture through carburetor.

10. Exhaust gas recirculation means as claimed in claim 1, wherein said flow control means further comprises means for shutting off the flow of exhaust gas during warming-up conditions of said engine.

11. Exhaust gas recirculation means as claimed in claim 1, wherein said port means is constituted by an opening defined by an inner wall surface of said carburetor, and further comprising a passage which is in a more or less horizontal line along the radial direction of the carburetor and is defined in a wall portion of said carburetor, one end of which is closed and the other end of which is open and communicates with said opening, and said delivery portion of said recirculation line and said delivery portion of said air duct communicate with different portions of said passage.

12. Exhaust gas recirculation means as claimed in claim 1, wherein said port means is constituted by an opening defined by an inner wall surface of said carburetor and a passage which is in a more or less horizontal line along the circumferential direction of the carburetor and is defined in a wall portion of said carburetor, one end of which is closed and the other end of which is open and communicates with said opening, and said delivery portion of said recirculation line and said delivery portion of said air duct communicate with different portions of said passage.

* * * * *